(12) United States Patent
Nanninga

(10) Patent No.: US 11,420,249 B2
(45) Date of Patent: Aug. 23, 2022

(54) ALUMINUM WHEELS AND METHODS OF MANUFACTURE

(71) Applicant: ACCURIDE CORPORATION, Evansville, IN (US)

(72) Inventor: Nicholas E. Nanninga, Evansville, IN (US)

(73) Assignee: ACCURIDE CORPORATION, Evansville, IN (US)

( * ) Notice: Subject to any disclaimer, the term of this patent is extended or adjusted under 35 U.S.C. 154(b) by 633 days.

(21) Appl. No.: 16/219,617

(22) Filed: Dec. 13, 2018

(65) Prior Publication Data

US 2019/0217376 A1    Jul. 18, 2019

Related U.S. Application Data

(60) Provisional application No. 62/617,018, filed on Jan. 12, 2018.

(51) Int. Cl.
*B21K 1/38* (2006.01)
*B21J 9/02* (2006.01)
(Continued)

(52) U.S. Cl.
CPC ............... *B21K 1/38* (2013.01); *B21J 9/025* (2013.01); *B21K 1/32* (2013.01); *B60B 3/002* (2013.01);
(Continued)

(58) Field of Classification Search
CPC .................................. C22F 1/04–057
See application file for complete search history.

(56) References Cited

U.S. PATENT DOCUMENTS 3,113,052 A    12/1963   Schneck
3,149,001 A     9/1964   Wallace
(Continued)

FOREIGN PATENT DOCUMENTS

CN         1497052 A    5/2004
CN       101649406 A    2/2010
(Continued)

OTHER PUBLICATIONS

JP-09078210-A English language translation (Year: 1997).*
(Continued)

*Primary Examiner* — Anthony J Zimmer
*Assistant Examiner* — Sean P. O'Keefe
(74) *Attorney, Agent, or Firm* — Michael Best & Friedrich LLP

(57) ABSTRACT

Aluminum wheels include a rim and a disc having a mounting portion. The mounting portion includes an inner mounting face and an outer mounting face. The mounting portion also includes a coarse grain region and a fine grain region. The coarse grain region can be adjacent, and at least partially form, one of the inner mounting face or the outer mounting face. The coarse grain region includes aluminum alloy grains of a first average grain length that is greater than 1 mm. The fine grain region extends between the coarse grain region and the other of the inner mounting face or the outer mounting face. The fine grain region includes aluminum alloy grains of a second average grain length that is less than 0.5 mm.

17 Claims, 10 Drawing Sheets

(51) Int. Cl.
  *C22C 21/02* (2006.01)
  *B60B 3/00* (2006.01)
  *B21K 1/32* (2006.01)
  *C22C 21/08* (2006.01)
  *B21J 5/02* (2006.01)
  *C22F 1/05* (2006.01)

(52) U.S. Cl.
  CPC .............. *C22C 21/02* (2013.01); *C22C 21/08* (2013.01); *C22F 1/05* (2013.01); *B21J 5/025* (2013.01); *B60B 2310/208* (2013.01); *B60B 2360/104* (2013.01); *C22C 2202/00* (2013.01)

(56) References Cited

U.S. PATENT DOCUMENTS

| | | | |
|---|---|---|---|
| 4,082,578 A | 4/1978 | Evancho et al. | |
| 5,027,508 A | 7/1991 | Cissell, II | |
| 5,240,519 A | 8/1993 | Kamio et al. | |
| 5,503,690 A | 4/1996 | Wade et al. | |
| 5,522,950 A | 6/1996 | Bartges et al. | |
| 5,571,347 A | 11/1996 | Bergsma | |
| 5,620,652 A | 4/1997 | Tack et al. | |
| 5,961,752 A | 10/1999 | Bergsma | |
| 6,248,189 B1 | 6/2001 | Shaffer et al. | |
| 6,361,741 B1 | 3/2002 | Klemp et al. | |
| 6,630,037 B1 | 10/2003 | Sawada et al. | |
| 7,163,594 B1 | 1/2007 | Tandon et al. | |
| 7,314,255 B2 | 1/2008 | Wang | |
| 8,152,940 B2 | 4/2012 | Nakai et al. | |
| 9,890,443 B2 | 2/2018 | Lin et al. | |
| 9,970,090 B2 | 5/2018 | Parson et al. | |
| 10,646,914 B2 | 5/2020 | Nanninga | |
| 2002/0031682 A1 | 3/2002 | Dif et al. | |
| 2002/0039664 A1 | 4/2002 | Magnusen et al. | |
| 2004/0035505 A1 | 2/2004 | Unal et al. | |
| 2004/0139610 A1 | 7/2004 | Suzuki et al. | |
| 2005/0086784 A1 | 4/2005 | Li et al. | |
| 2005/0095167 A1 | 5/2005 | Barth et al. | |
| 2007/0144630 A1 | 6/2007 | Anami et al. | |
| 2008/0145266 A1 | 6/2008 | Chen et al. | |
| 2010/0047114 A1 | 2/2010 | Shibata et al. | |
| 2012/0241055 A1 | 9/2012 | Okamoto | |
| 2012/0325381 A1 | 12/2012 | Gasqueres et al. | |
| 2014/0017116 A1 | 1/2014 | Lin et al. | |
| 2014/0096878 A1 | 4/2014 | Hatta et al. | |
| 2014/0096879 A1 | 4/2014 | Kim | |
| 2014/0166165 A1 | 6/2014 | Shibata | |
| 2014/0261909 A1 | 9/2014 | Shih et al. | |
| 2014/0290809 A1* | 10/2014 | Hori | C22C 21/08 148/550 |
| 2014/0366997 A1 | 12/2014 | Kamat et al. | |
| 2015/0007909 A1 | 1/2015 | Matsumoto et al. | |
| 2015/0013857 A1 | 1/2015 | Uggowitzer et al. | |
| 2016/0115575 A1 | 4/2016 | Bull et al. | |
| 2017/0247782 A1 | 8/2017 | Matsumoto et al. | |

FOREIGN PATENT DOCUMENTS

| | | | |
|---|---|---|---|
| CN | 101792877 A | 8/2010 | |
| CN | 102477507 A | 5/2012 | |
| CN | 103060635 A | 4/2013 | |
| CN | 103695737 A | 4/2014 | |
| CN | 103695738 A | 4/2014 | |
| CN | 103774000 A | 5/2014 | |
| CN | 103966487 A | 8/2014 | |
| CN | 105268903 A | 1/2016 | |
| DE | 2817261 A1 | 11/1978 | |
| EP | 0584028 A1 | 2/1994 | |
| EP | 0987344 A1 | 3/2000 | |
| EP | 2811043 A1 | 12/2014 | |
| EP | 3124633 A1 | 2/2017 | |
| GB | 840469 A | 7/1960 | |
| GB | 1037750 A | 8/1966 | |
| JP | S5292812 A | 8/1977 | |
| JP | S58167757 A | 10/1983 | |
| JP | S59215453 A | 12/1984 | |
| JP | H03006348 A | 1/1991 | |
| JP | H06211336 A | 8/1994 | |
| JP | H06256880 A | 9/1994 | |
| JP | 406330264 A | 11/1994 | |
| JP | H07150312 A | 6/1995 | |
| JP | H07188824 A | 7/1995 | |
| JP | H07252570 A | 10/1995 | |
| JP | H07252616 A | 10/1995 | |
| JP | H0913137 A | 1/1997 | |
| JP | 09078210 A * | 3/1997 | |
| JP | H09249951 A | 9/1997 | |
| JP | H09249952 A | 9/1997 | |
| JP | H108172 A | 1/1998 | |
| JP | H108173 A | 1/1998 | |
| JP | H108174 A | 1/1998 | |
| JP | H10317113 A | 12/1998 | |
| JP | H10317115 A | 12/1998 | |
| JP | H11047936 A | 2/1999 | |
| JP | H11323472 A | 11/1999 | |
| JP | H11350058 A | 12/1999 | |
| JP | 2000144296 A | 5/2000 | |
| JP | 2000212708 A | 8/2000 | |
| JP | 2000282162 A | 10/2000 | |
| JP | 2001059124 A | 3/2001 | |
| JP | 2001335871 A | 12/2001 | |
| JP | 2002294383 A | 10/2002 | |
| JP | 2002317255 A | 10/2002 | |
| JP | 2002348630 A | 12/2002 | |
| JP | 2002348630 A * | 12/2002 | |
| JP | 2002371332 A | 12/2002 | |
| JP | 2003105473 A | 4/2003 | |
| JP | 2003181530 A | 7/2003 | |
| JP | 2004292847 A | 10/2004 | |
| JP | 2006206984 A * | 8/2006 | |
| JP | 2006206984 A | 8/2006 | |
| JP | 2010174337 A | 8/2010 | |
| KR | 20130000341 A | 1/2013 | |
| WO | WO09059826 A1 | 5/2009 | |
| WO | 2013165069 A1 | 11/2013 | |
| WO | 2015016320 A1 | 2/2015 | |
| WO | WO15077880 A1 | 6/2015 | |

OTHER PUBLICATIONS

JP-2002348630-A English language translation (Year: 2002).*
International Search Report with Written Opinion for Application No. PCT/US18/65511 dated May 7, 2019 (15 pages).
Notice of Invitation to Pay Additional Fees from the International Searching Authority for related Application No. PCT/US18/65511 dated Feb. 26, 2019 (2 pages).
International Search Report with Written Opinion for related Application No. PCT/US18/65526 dated Mar. 4, 2019 (12 pages).
International Preliminary Report on Patentability for related Application No. PCT/US2018/065526 dated Jul. 23, 2020 (7 Pages).
International Preliminary Report on Patentability for related Application No. PCT/US2018/065511 dated Jul. 23, 2020 (8 Pages).
Office Action issued from the Chinese Patent Office for related Application No. 201880085929.5 dated Aug. 25, 2021 (28 Pages including English Translation).
Extended Search Report issued from the European Patent Office for related Application No. 18899084.0 dated Sep. 16, 2021 (8 Pages).
Extended Search Report issued from the European Patent Office for related Application No. 18900143.1 dated Sep. 21, 2021 (8 Pages).
Communication issued from the European Patent Office for related Application No. 18900143.1 dated Oct. 8, 2021 (1 Page).
Notice of Preliminary Rejection issued from the Korean Patent Office for related Application No. 10-220-7019705 dated Jan. 20, 2022 (11 Pages including English Translation).

* cited by examiner

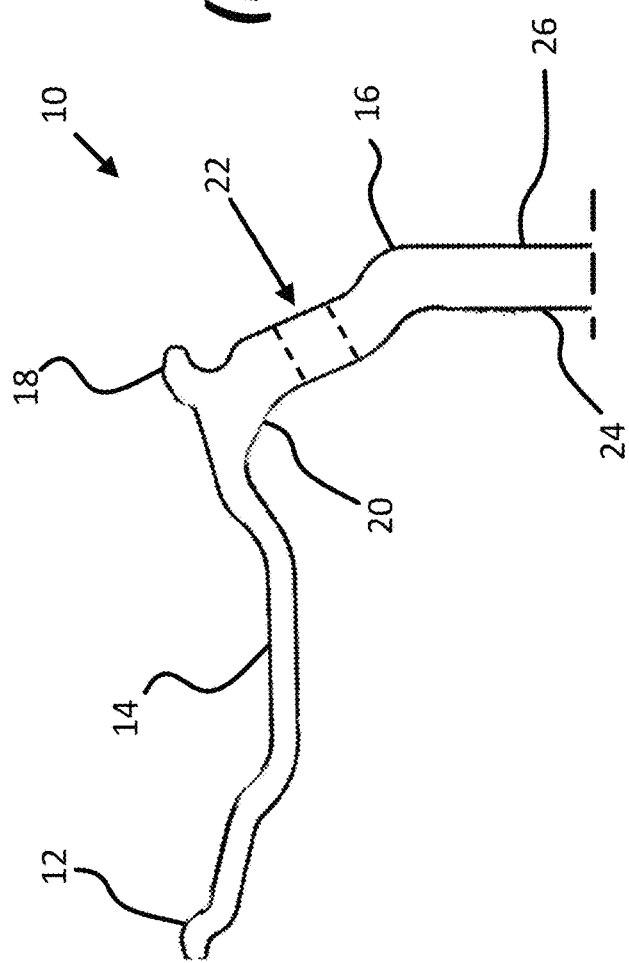
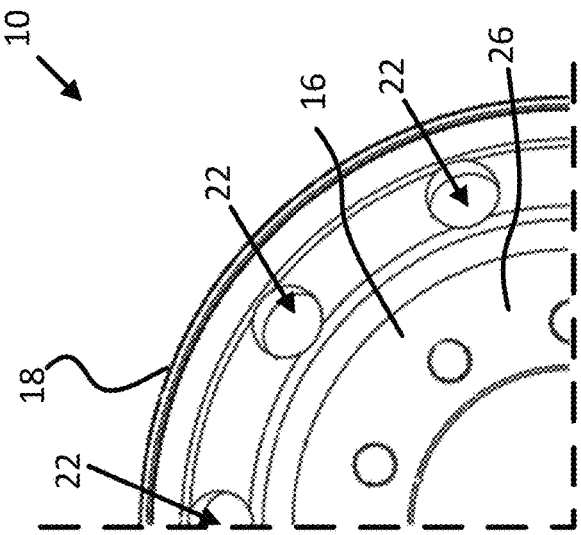
FIG. 1A (Prior Art)
FIG. 1B (Prior Art)

US 11,420,249 B2

ALUMINUM WHEELS AND METHODS OF MANUFACTURE

CROSS-REFERENCE TO RELATED APPLICATIONS

The present application claims priority to U.S. provisional patent application No. 62/617,018, filed Jan. 12, 2018, the disclosure of which is hereby incorporated by reference in its entirety.

FIELD OF DISCLOSURE

The present disclosure relates to aluminum alloy wheels and the materials, methods, and techniques of their manufacture. More specifically, the present disclosure relates to aluminum alloy wheels having particular grain structures.

INTRODUCTION

Aluminum wheels can experience fatigue and develop cracks in one or more locations. FIG. 1A is a partial side, cross-sectional view of prior art wheel 10. FIG. 1B is a partial front plan view of prior art wheel 10. Wheel 10 includes rim 12 and disc 16, connected near transition radius 20. Rim 12 includes rim drop center 14 and closed side flange 18. Disc 16 defines a plurality of hand holes 22. At a mounting portion, disc 16 defines concave disc face 24 and convex disc face 26. Typically, wheel cracks from fatigue can occur in a rim drop center, near the closed side flange, near the transition radius, at the concave disc face, at the convex disc face, and adjacent to a hand hole.

SUMMARY

Materials, methods and techniques disclosed and contemplated herein relate to aluminum alloy wheels. Aluminum wheels manufactured with aluminum alloys disclosed herein, and in accordance with methods and techniques disclosed here, exhibit improved performance compared to existing aluminum wheels.

In one aspect, a wheel including a rim and a disc is disclosed. The disc comprises a mounting portion including an inner mounting face and an outer mounting face. The mounting portion also includes a coarse grain region and a fine grain region. The coarse grain region can be adjacent, and at least partially form, one of the inner mounting face or the outer mounting face. The coarse grain region includes aluminum alloy grains of a first average grain length that is greater than 1 mm. The fine grain region extends between the coarse grain region and the other of the inner mounting face or the outer mounting face. The fine grain region includes aluminum alloy grains of a second average grain length that is less than 0.5 mm.

In another aspect, a method for manufacturing a wheel having a rim and a disc is disclosed. The disc has a mounting portion including an inner mounting face and an outer mounting face. The method includes: heating an aluminum alloy billet to a temperature of no less than 480° C. and no greater than 540° C.; rotary forging the heated aluminum alloy billet; and after rotary forging, removing a forging cover stock such that the mounting portion of the disc includes a coarse grain region and a fine grain region. The coarse grain region can be adjacent, and at least partially form, one of the inner mounting face or the outer mounting face. The coarse grain region includes aluminum alloy grains of a first average grain length that is greater than 1 mm. The fine grain region extends between the coarse grain region and the other of the inner mounting face or the outer mounting face. The fine grain region includes aluminum alloy grains of a second average grain length that is less than 0.5 mm.

In another aspect, a wheel comprising a rim and a disc connected to the rim is disclosed. The disc includes a mounting portion including an inner mounting face and an outer mounting face, as well as a coarse grain region and a fine grain region. The coarse grain region can be adjacent, and at least partially form, one of the inner mounting face or the outer mounting face. The coarse grain region includes aluminum alloy grains of a first average grain length that is greater than 1 mm and less than 25 mm. The coarse grain region can have a depth of no less than 0.2 mm. The fine grain region extends between the coarse grain region and the other of the inner mounting face or the outer mounting face. The fine grain region includes aluminum alloy grains of a second average grain length that is less than 0.5 mm. The disc also includes a disc slope region between the mounting portion and the rim. The disc slope region includes aluminum alloy grains of the second average grain length.

Other aspects of the disclosure will become apparent by consideration of the detailed description and accompanying drawings. There is no specific requirement that a material, technique or method include all of the details characterized herein, in order to obtain some benefit according to the present disclosure. Thus, the specific examples characterized are meant to be exemplary applications of the techniques described, and alternatives are possible.

BRIEF DESCRIPTION OF THE DRAWINGS

FIG. 1A is a partial side, cross-sectional view of a prior art aluminum wheel.

FIG. 1B is a partial front plan view of the wheel shown in FIG. 1A.

DETAILED DESCRIPTION

Vehicle wheels are typically made of various materials, such as aluminum alloys and steel. Safety and performance considerations for vehicle wheels include a given wheel's ability to resist fatigue for extended periods of time. It is particularly challenging to achieve that goal with aluminum wheels, which are designed to be lighter than steel wheels.

Aluminum wheels manufactured as described herein and using the materials, techniques and methods described and contemplated herein have improved fatigue performance. Broadly characterized, advantageous properties in aluminum wheels disclosed herein can be attributed to grain structures resulting from selection and performance of components and techniques disclosed herein.

Aluminum wheels disclosed and contemplated herein include particular grain structures in various portions of the wheel. For instance, the aluminum wheels herein include fine grains throughout a disc portion, except for at one or both of the disc mounting faces. One or both of the mounting faces include coarse grains. Coarse grain regions at the mounting face(s) provide resistance to fretting fatigue and to rapid fatigue crack propagation.

Generally, these grain microstructures can be obtained by rotary forging a suitable aluminum alloy billet at a temperature between 480° C. and 540° C. Rotary forging can provide sufficient friction between the work piece and a top die to cause post-solution heat treatment recrystallization on the convex disc mounting face.

Hereafter, example aluminum wheels are described, as well as example aluminum alloys that can be used in the aluminum wheels. Example methods for making aluminum wheels are also described. Last, a description is provided of experimental test results relating to the example aluminum wheels manufactured in accordance with various techniques and methods disclosed and contemplated herein.

I. EXAMPLE WHEELS

Aluminum wheels described and contemplated herein can be characterized, for instance, by grain structure. Various aluminum alloys can be used in the methods and techniques described herein, and exemplary embodiments are provided below.

A. Grain Structure

Figure 2:
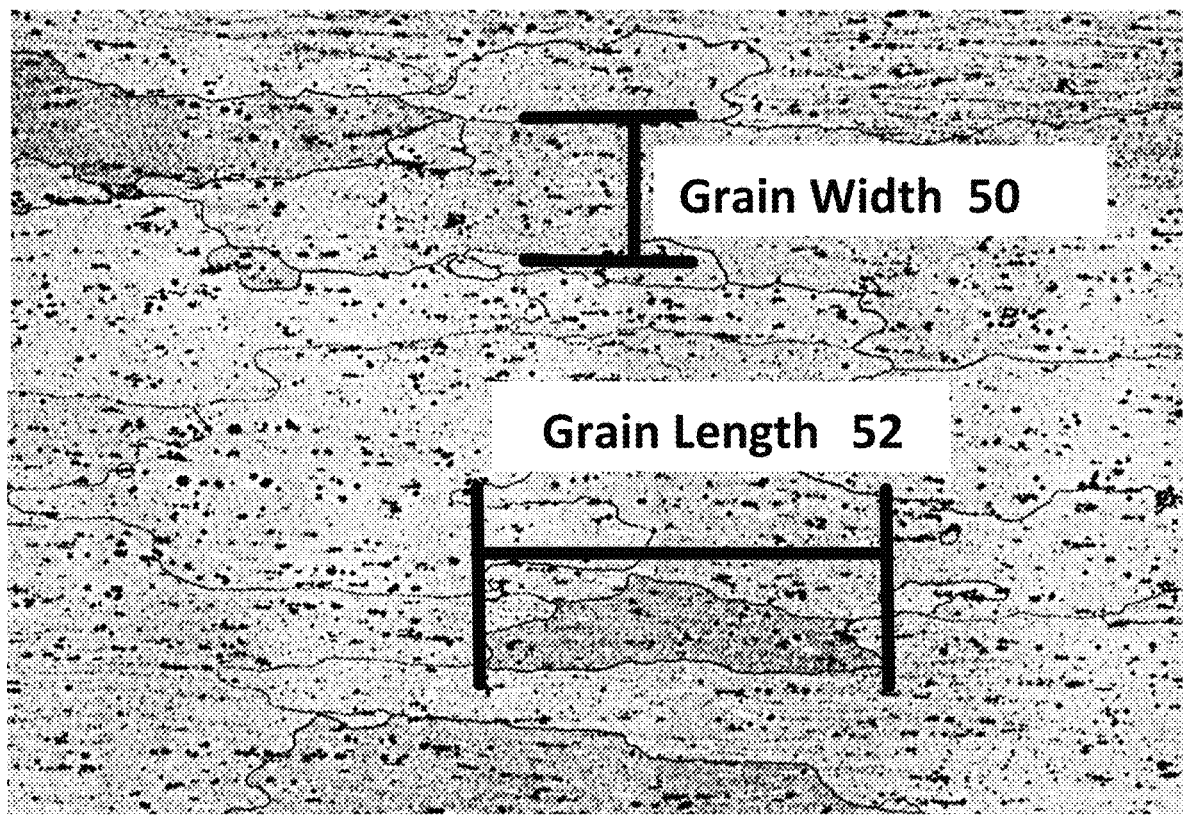
FIG. 2 shows a determination of grain width and grain length in a micrograph.

As mentioned above, aluminum wheels disclosed and contemplated herein can be characterized by grain structure. As used herein, a "grain" is a pancake-shaped, distinct crystal in the aluminum wheel, usually having an aspect ratio of length to width of from 1 to 25. Grain size analysis can be discussed in terms of grain length and grain width, where both grain length and grain width measurements are average values of the grains. An example identification of grain width 50 and grain length 52 is shown in FIG. 2. For this disclosure, grain size is typically measured on the scale micrometer for fine grain structures and millimeters for coarser grain structures.

Generally speaking, during forming and heat treating processes, grain size changes. Grain size changes relate to the types of forming processes used and the quantity of dispersoids. Dispersoids are part of the chemical composition and are formed from certain elements (e.g., Fe, Mn, Cr) in the alloys. Dispersoid density can control the resulting grain structure and grain size.

Where aluminum alloys disclosed and contemplated herein are used in the manufacture of wheels, grain size impacts wheel fatigue performance. As shown below in experimental examples, wheel fatigue performance improves with wheels having coarse grain regions in the mounting areas of aluminum wheels.

Coarse grains in a volume of an aluminum wheel is defined herein as a "coarse grain region." Generally, coarse grain regions include grains having an average grain length greater than 1 mm and less than 25 mm. That is, an average length of the grains in a particular region is greater than 1 mm and less than 25 mm. It will be appreciated that some grains in a coarse grain region may have lengths slightly longer than 25 mm or slightly shorter than 1 mm. For example, a coarse grain region includes less than 10% fine grain material; less than 5% fine grain material; less than 3% fine grain material; or less than 1% fine grain material.

Finer grains are typically better for resisting the formation of fatigue cracks. Fine grains can be defined as unrecrystallized grains formed during casting, unrecrystallized grains with subgrains formed during hot forging, or dynamically recrystallized grains formed during hot forging.

Fine grains in a volume of an aluminum wheel is defined herein as a "fine grain region." Generally, fine grain regions 116 in wheel 100 include grains having an average grain length less than 0.5 mm and greater than 1 μm. That is, an average length of the grains in a particular region is less than 0.5 mm and greater than 1 μm. It will be appreciated that some grains in a fine grain region may have lengths slightly longer than 0.5 mm, but less than 1 mm.

Grain size can be determined using the following method. First, a sample is metallographically polished with final colloidal silica (0.04 μm) polish. In various instances, samples can be obtained from a disc slope portion and a mounting portion of an aluminum wheel. Then a swab etch with Keller's reagent (2 ml HF, 3 ml HCL, 5 ml $HNO_3$, 190 ml $H_2O$) is performed for approximately 1 minute. Then optical microscopy and grain size measurements can be performed by the ASTM E112 line method in the horizontal (length) and vertical (width) directions.

Grain size determination typically includes determining an average grain length and width of grains within one or more samples. The samples are two dimensional sections of a wheel. Grain size can be determined in each sample and, where multiple samples are used in the determination, the grain sizes may be averaged. As an example, multiple samples along the wheel profile are obtained and each sample may have a length of 25 mm and a width equal to the wheel thickness.

B. Grain Regions of the Aluminum Wheels

Figure 3:
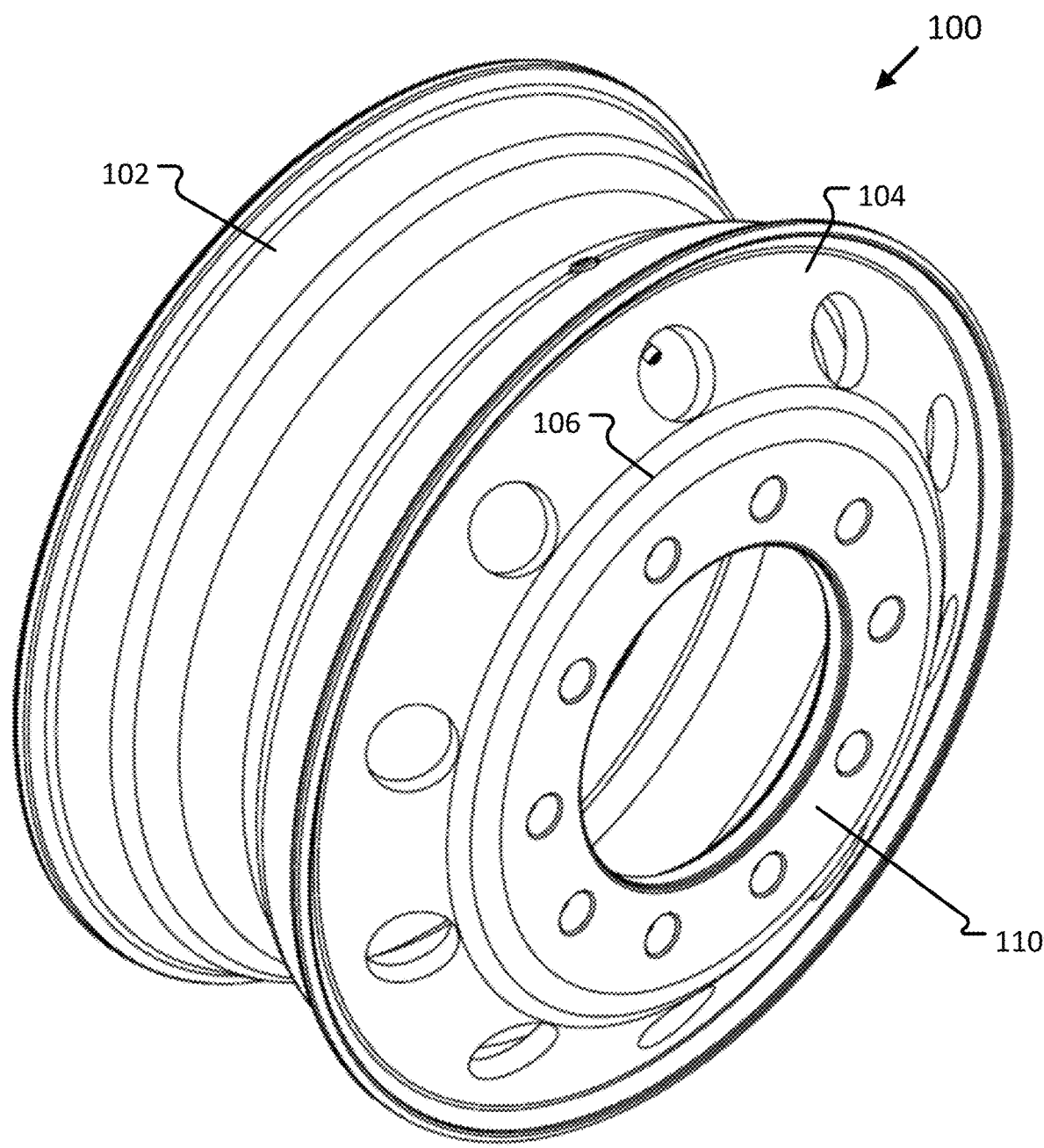
FIG. 3 is a front perspective view of an example aluminum wheel according to the present disclosure.
Figure 4:
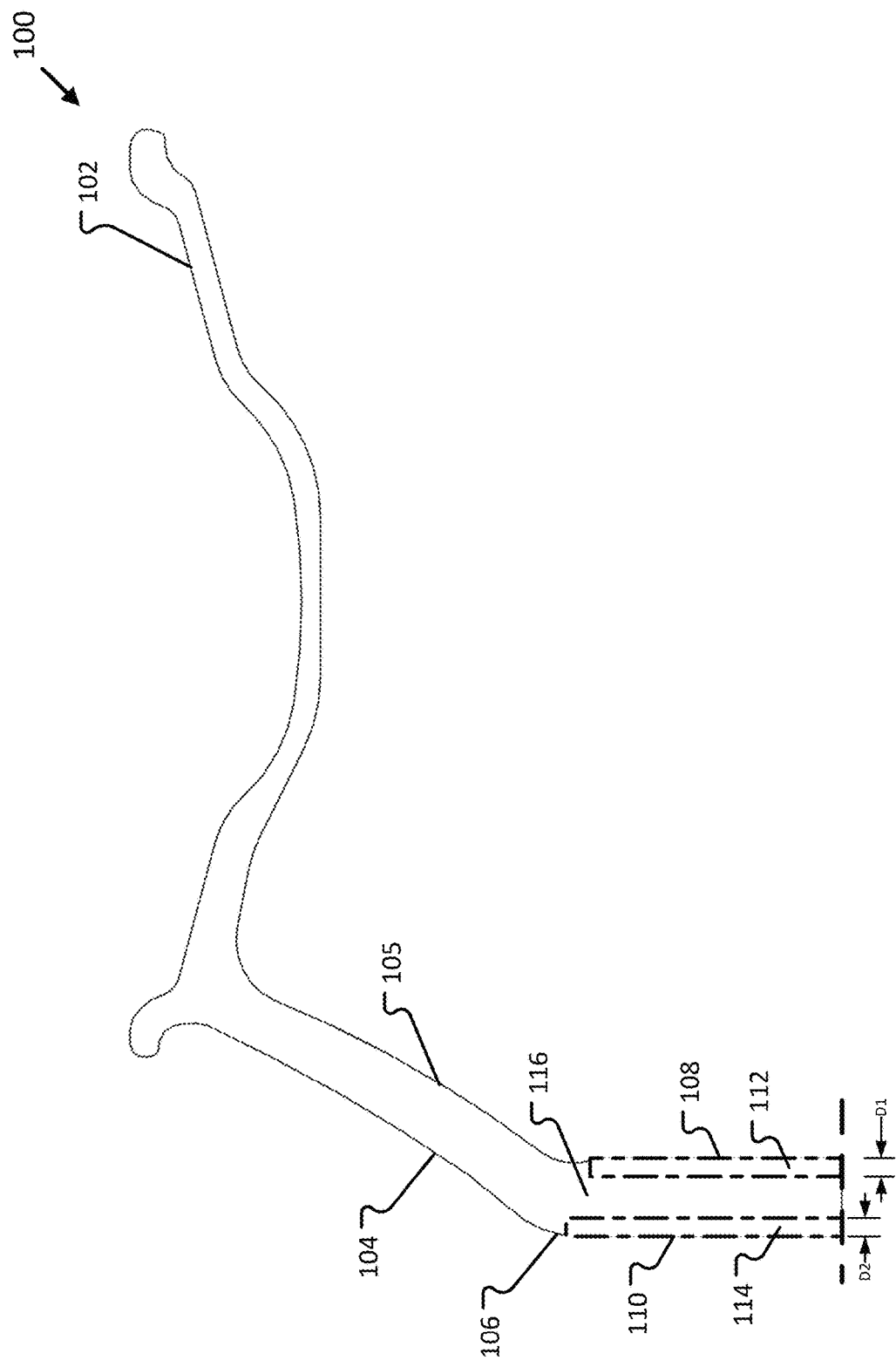
FIG. 4 is a schematic, partial side, cross-sectional view of the example aluminum wheel shown in FIG. 3.

FIG. 3 shows example wheel 100. FIG. 4 is a schematic, side sectional view of an upper portion of wheel 100. A lower portion of wheel 100, not shown, would be a mirror image of that shown in FIG. 3. FIGS. 3 and 4 are discussed concurrently below, unless otherwise noted. Wheel 100 includes rim 102 and disc 104. Disc 104 includes disc slope region 105 and mounting portion 106. Mounting portion 106 includes inner mounting face 108 and outer mounting face 110.

In an example use of wheel 100, a tire (not shown) is positioned adjacent to rim 102 and wheel 100 is secured to a vehicle via mounting portion 106. More specifically, mounting portion 106 is typically secured to a vehicle hub or drum via, for example, flange nuts. Example implementations include wheel 100 mounted to commercial vehicles, such as tractor-trailers. In some implementations, wheel 100 is manufactured as part of a 22.5 inch by 8.25 inch (57.15 cm by 20.955 cm) hub-piloted wheel weighing approximately 45 lbs (20.4117 kg), such as Accuride™ wheel part 41644. In some implementations, wheel 100 is manufactured as part of a 22.5 inch by 8.25 inch (57.15 cm by 20.955 cm) hub-piloted wheel weighing approximately 40 lbs (18.1437 kg), such as Accuride™ wheel part 42644.

At least one of inner mounting face 108 and outer mounting face 110 includes a coarse grain region in a volume of the disc mounting portion 106." In some instances, both inner mounting face 108 and outer mounting face 110 include a coarse grain region.

Coarse grain region 112 is shown schematically as adjacent to inner mounting face 108. Inner mounting face 108 is formed, partially or fully, by coarse grain region 112. Coarse grain region 114 is shown schematically as adjacent to outer mounting face 110. Outer mounting face 110 is formed, partially or fully, by coarse grain region 114.

Wheel 100 also includes fine grains distributed in a volume, defined as a fine grain region 116. Fine grain region 116 extends throughout disc slope region 105 and in disc mounting area 106 where there are no coarse grain regions.

In embodiments where coarse grain region 112 exists and coarse grain region 114 does not, fine grain region 116 extends between outer mounting face 110 and coarse grain region 112. In embodiments where coarse grain region 114 exists and coarse grain region 112 does not, fine grain region 116 extends between grain region 114 and inner mounting face 108. In embodiments where both coarse grain region 112 and coarse grain region 114 exist, fine grain region 116 extends between coarse grain region 112 and coarse grain region 114.

Coarse grain region 112 has depth D1 and coarse grain region 114 has depth D2. Depth D1 and depth D2 are measured as distances normal to inner mounting face 108 and outer mounting face 110, respectively. Put another way, depth D1 and depth D2 are dimensions extending between inner mounting face 108 and outer mounting face 110 and parallel with a rotational axis of the wheel 100.

Although coarse grain regions 112 and 114 are shown schematically in FIG. 4 as having uniform depths D1 and D2, it will be appreciated that in many instances, depths D1 and D2 may vary throughout each region. In some instances, depths D1 and D2 are a maximum depth from the mounting surface 108, 110, respectively. In some instances, depths D1 and D2 are an average depth along the respective region 112, 114.

In some instances, coarse grain region 112 has a depth D1 of no less than 0.2 mm. In some instances, coarse grain region 112 has a depth D1 of no less than 6.35 mm. In some instances, coarse grain region 114 has a depth D2 of no less than 0.2 mm. In some instances, coarse grain region 114 has a depth D2 of no less than 6.35 mm. In some instances, coarse grain region 112 has a depth D1 that extends across mounting portion 106.

C. Example Aluminum Alloys

Aluminum wheels disclosed and contemplated herein can be manufactured using aluminum alloys having various components at various weight percentages. One example of an aluminum alloy disclosed and contemplated herein includes: silicon (Si), iron (Fe), copper (Cu), manganese (Mn), magnesium (Mg), chromium (Cr), zinc (Zn), and/or titanium (Ti), with a balance being aluminum. Example aluminum alloys with these elements and usable in the materials, methods, and techniques disclosed and contemplated herein include AA6099 and AA6061.

In some implementations, aluminum alloys disclosed and contemplated herein include, by weight, 0.80% to 1.20% silicon; 0.7% iron; 0.10% to 0.70% copper; 0.10% to 0.40% manganese; 0.70% to 1.20% magnesium; 0.04% to 0.35% chromium; 0.25% zinc; 0.10% titanium, and the balance of weight percent comprising aluminum and, in certain instances, incidental elements and impurities.

In other implementations, aluminum alloys disclosed and contemplated herein include, by weight, 0.40% to 0.80% silicon; 0.7% iron; 0.15% to 0.40% copper; 0.15% manganese; 0.80% to 1.20% magnesium; 0.04% to 0.35% chromium; 0.25% zinc; 0.15% titanium, and the balance of weight percent comprising aluminum and, in certain instances, incidental elements and impurities.

Different elements in the aluminum alloys can impact grain structure and resulting wheel performance. For example, too much silicon and manganese can undesirably result in having fine grains (e.g. about 0.0001 inches to about 0.01 inches) on the mounting face 200. Conversely, too little silicon and manganese can undesirably result in coarse grains in other parts of the vehicle wheel disc 20 (outside of the mounting face 200). Copper in the alloy may enhance fatigue and static strength. The inclusion of silicon and magnesium may result in the alloy having higher strength. The inclusion of manganese and chromium may allow these elements to join with silicon to form particles that may help control grain structure. These particles may also impede crack propagation due to fatigue.

Incidental elements and impurities in the disclosed alloys may include, but are not limited to, nickel, vanadium, zirconium, or mixtures thereof, and may be present in the alloys disclosed herein in amounts totaling no more than 1%, no more than 0.9%, no more than 0.8%, no more than 0.7%, no more than 0.6%, no more than 0.5%, no more than 0.4%, no more than 0.3%, no more than 0.2%, no more than 0.1%, no more than 0.05%, no more than 0.01%, or no more than 0.001%.

The alloys described herein may consist only of the above-mentioned constituents, may consist essentially of such constituents, or, in other embodiments, may include additional constituents.

D. Dispersoids

Aluminum wheels disclosed and contemplated herein can also be characterized by dispersoids. The term "dispersoids" is known in the art and, generally, refers to pieces of various alloy components. For instance, dispersoids can be iron, manganese, chromium, titanium, and/or silicon rich intermetallic compounds with various stoichiometry's (Al—Fe—Si, Al—Mn, Al—Cr, Al—Fe(Mn,Cr)—Si, Al—V, Al—Zr, Al—Ti).

Generally speaking, desired grain structures (e.g., grain size and distribution) are impacted by the number, size and distribution of dispersoids in the aluminum alloy. For common commercially available aluminum alloys, the number of dispersoids in the aluminum alloy can be related to an amount of iron, manganese, or chromium, as well as the homogenization temperature of the cast billet.

Homogenization methods can be adapted to attain one or more desired properties as disclosed and contemplated herein. As an example, homogenization can include slowly heating a billet to a temperature between 550° C. and 575° C. for between 2 hours and 8 hours, followed by air cooling via a fan. In some instances, homogenization occurs at a temperature between 550° C. and 560° C. In some instances, homogenization heating occurs for about 4 hours.

Aluminum alloys include dispersoids in a density sufficient to provide fine grain regions in the disc slope region and in the mounting areas adjacent to one or more coarse grain regions. Sufficient dispersoids density can prevent coarse grain recrystallization in various areas of the wheel disc, such as outside of the concave mounting surface and the convex mounting surface.

In some implementations, dispersoids in the aluminum wheels disclosed and contemplated herein have a distribution of no less than 20 per $\mu m^2$. In other implementations, dispersoids in the aluminum wheels disclosed and contemplated herein have a distribution of from 20 per $\mu m^2$ to 50 per $\mu m^2$.

In some implementations, dispersoids have an average size of from 230 nm to 260 nm. In other implementations, dispersoids have an average size of from 230 nm to 250 nm. In yet other implementations, dispersoids have an average size of from 228 nm to 248 nm.

E. Forging

Billets of aluminum alloy compositions disclosed and contemplated herein can be forged on rotary forging presses to produce various products. For example, aluminum alloy billets can be forged into a portion of a wheel using a rotary forging press.

Typical rotary forging presses usable in methods and techniques described herein include an upper die and a lower die. A commercially available rotary forging press usable in methods and techniques described and contemplated herein is the SMS Wagner 350 ton rotary forging press (SMS Group GmbH, Dusseldorf, Germany).

Other forging processes are possible, such as flow forming the disc mounting surfaces, embossing, and stamping or multistep forging processes. For instance, methods and techniques disclosed and contemplated herein can include forging a pancake, then the bowl shape, and then forging the rim. As another example, methods and techniques disclosed and contemplated herein can include forging the pancake, then the bowl, and then spin forming the rim.

Aluminum alloy billet forging can occur at various temperatures, assuming atmospheric pressure conditions. Atmospheric pressure conditions mean a pressure of the external environment at the location at which the process of the present disclosure is operated. As examples, aluminum alloy billets can be forged at a temperature no less than 480° C. and no greater than 540° C. In other implementations, aluminum alloy billets are forged at a temperature no less than 495° C. and no greater than 520° C. As specific examples, cast aluminum alloy billets can be forged at a temperature of 480° C., 490° C., 500° C., 510° C., 520° C., 530° C., or 540° C.

II. EXAMPLE METHODS OF MAKING ALUMINUM WHEELS

Figure 5:
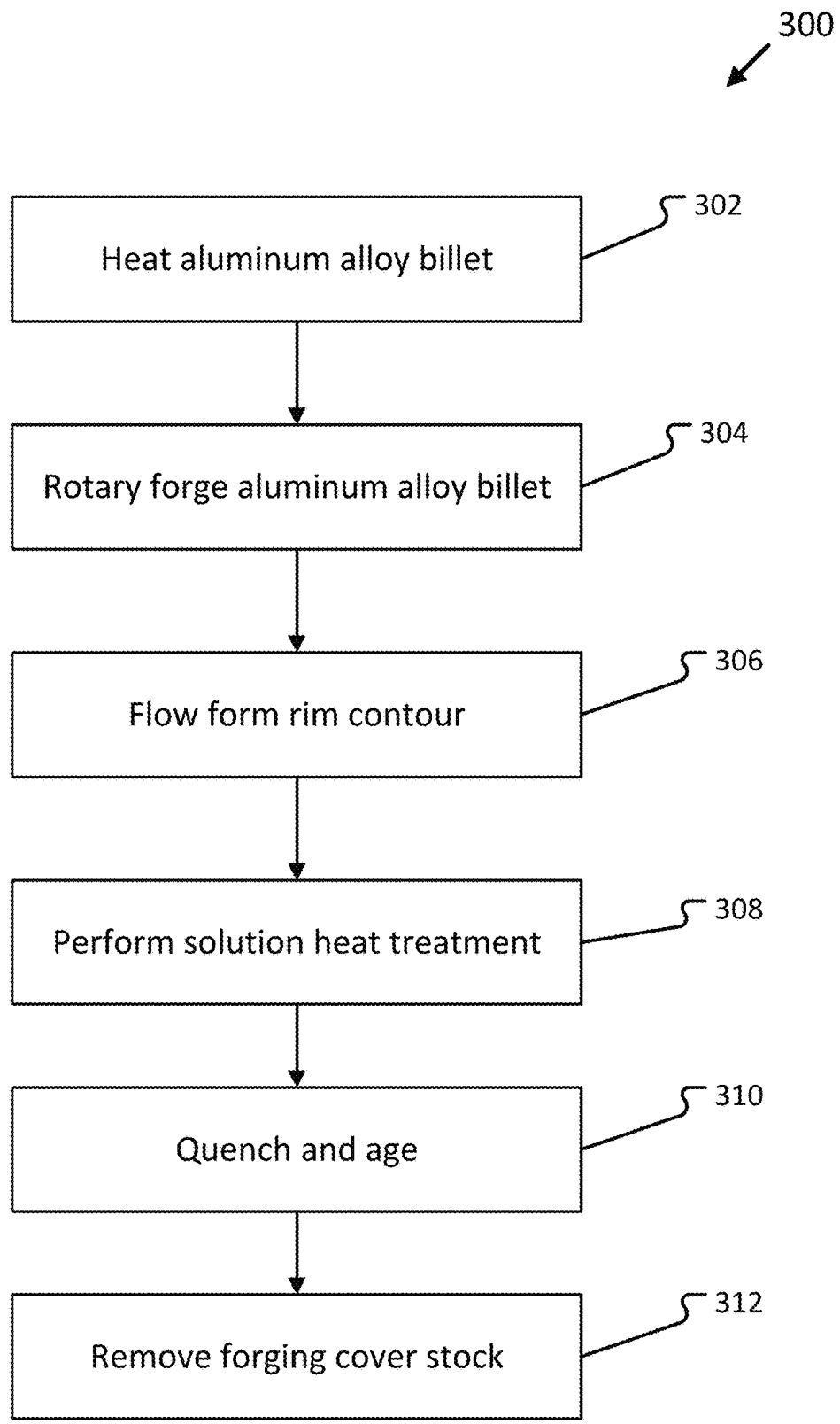
FIG. 5 shows an example method for manufacturing an aluminum wheel according to the present disclosure.

FIG. 5 shows an example method 300 for manufacturing an aluminum wheel. Method 300 includes heating an aluminum alloy billet (operation 302), rotary forging the aluminum alloy billet (operation 304), flow forming a contour of the rim (operation 306), performing solution heat treatment (operation 308), quenching and aging (operation 310), and removing a forging cover stock (operation 312). Other embodiments can include more or fewer operations.

Method 300 begins by heating an aluminum alloy billet (operation 302). The aluminum alloy billet can include components described above, such as components found in AA6061 or AA6099. During operation 302, the aluminum alloy billet is heated to a temperature of from 480° C. to 540° C.

After heating the aluminum alloy billet (operation 302), the aluminum alloy billet is rotary forged (operation 304). Rotary forging (operation 304) is usually performed with a continuous stroke of a tilted and rotating die. In some implementations, rotary forging (operation 304) includes a single, downward continuous stroke performed at a strain rate of from 0.01 seconds$^{-1}$ to 0.3 seconds$^{-1}$ (in/in/sec). As mentioned above, forging (operation 304) can include different operations, such as flow forming the disc mounting surfaces, embossing, and stamping or multi-step forging processes.

Rotary forging can be "bowl up" or "bowl down" (when conceptualizing the wheel forging as bowl shaped). Typically, rotary forging (operation 304) is performed bowl down where, as the upper and lower dies spin, sides of the bowl are pushed downward. As the sides of the bowl are pushed downward, kneading or extra friction is applied to the convex disc surface, particularly in the mounting area. This is because the upper die dwells on the surface and creates strain on the surface from the "kneading" motion of the upper die in combination with friction.

During rotary forging (operation 304), the forging undergoes a transformation to a stable, unrecrystallized/dynamically recrystallized structure throughout the wheel disc, with the exception of the convex disc mounting surface, which transforms during solution heat treatment.

After rotary forging (operation 304), a contour of the rim can be flow formed (operation 306). Flow forming the rim contour (operation 306) can be performed at a temperature of from 21° C. to 316° C. Flow forming is alternatively referred to in the art as spin forming. Typically, flow forming includes locally contacting a portion of the wheel with a tool as the wheel spins. Because the tool is typically small (e.g., on the order of 2-4 cm), deformations to the wheel are also typically localized.

After flow forming (operation 306), solution heat treatment can be performed (operation 308). Solution heat treatment (operation 308) can be performed at a temperature of, for example, from 510° C. to 566° C. It is believed that during solution heat treatment (operation 308), material near the convex disc mounting surface undergoes static recrystallization and/or grain growth, but the grain structure remains relatively unchanged in the remainder of the disc.

After performing solution heat treatment (operation 308), the wheel is quenched and aged (operation 310). Aging can be performed at a temperature of from 148° C. to 233° C. Next, forging cover stock is removed (operation 312) as the forging is machined into a finished wheel.

Generally, the aluminum alloy billet includes more material mass than the desired end product. As used herein, the "cover stock" is the extra material that is removed after forging that is not part of the finished wheel. In some instances, forging cover stock accounts for a large portion of the aluminum alloy billet mass. Various methods known in the art can be used to remove forging cover stock, such as machining using a CNC lathe.

Forging cover stock is removed (operation 310) such that the mounting portion of the disc includes at least one coarse grain region and a fine grain region, as discussed in greater detail above. In some instances, cover stock on a wheel forging may be between 1 mm and 10 mm. The coarse grain region(s) are adjacent to and at least partially form one of the outer mounting face or the inner mounting face. The coarse grain region includes aluminum alloy grains having an average grain length greater than 1 mm and less than 25 mm. A fine grain region extends between the coarse grain region and the other of the outer mounting face or the inner mounting face. The fine grain region includes aluminum alloy grains having an average grain length of less than 0.5 mm.

III. EXPERIMENTAL EXAMPLES

Experimental examples of aluminum wheels disclosed above were made and tested. In some instances, the experimental wheels were compared with existing commercial wheels. In particular, experiments on the wheels included performance testing such as radial wheel fatigue performance determinations and grain structure characterization.

A. Experimental Grain Structure Determination

Experiments were performed to evaluate grain structure for various aluminum wheels. One objective of the experiments was to compare grain structure in an example wheel manufactured in accordance with methods and techniques disclosed herein to existing commercial wheels. Three different types of aluminum wheels were evaluated, and each aluminum wheel was an industry standard 22.5 inch by 8.25 inch hub-mounted wheel weighing 18.2 kg (part number 42544). Test wheel A is a wheel that was closed die forged at 510° C. Test wheel B is an experimental example of a wheel that was rotary forged at 500° C. in accordance with various techniques and methods disclosed herein. Test wheel C is a wheel that was closed die forged at 450° C. Each of test wheel A, test wheel B, and test wheel C was manufactured using aluminum alloy AA6099.

Figure 6:
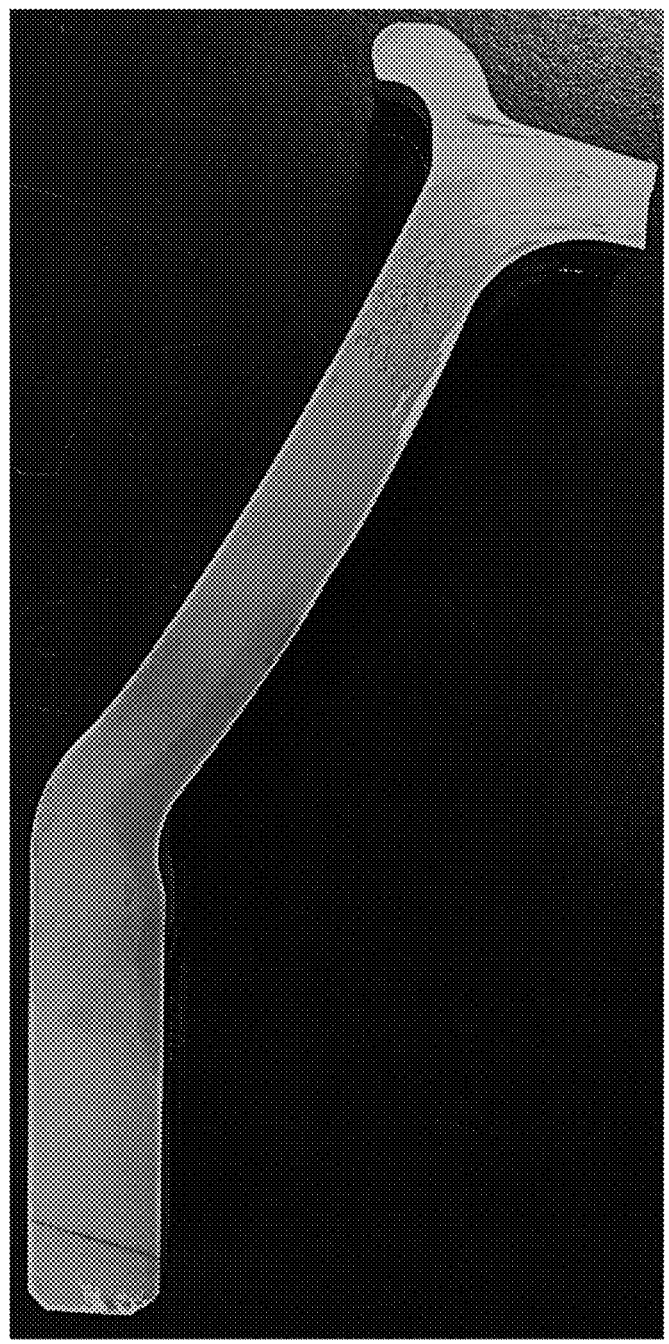
FIG. 6 shows grain structures in a disc portion of a wheel after etching.
Figure 7:
FIG. 7 shows grain structures in a disc portion of a wheel according to the present disclosure after etching.
Figure 8:
FIG. 8 shows grain structures in a disc portion of another wheel after etching.

FIGS. 6-8 show photographs of experimental results from etching test wheel A, test wheel B, and test wheel C. Etching was performed by (1) uniform grinding with 120 grit SiC and (2) 5 minutes in solution of 300 mL $H_2O$, 75 g $FeCl_3$, 450 mL $HNO_3$, and 150 mL HCl at room temperature. As seen in FIG. 6, test wheel A has fine grains throughout the disc mounting region and disc slope region. As seen in FIG. 7, test wheel B has a coarse grain region on the outer mounting face and fine grains throughout the remainder of the disc. As seen in FIG. 8, test wheel C has coarse grain regions and fine grain regions randomly distributed in the mounting area and coarse grains in the disc slope region.

B. Experimental Radial Fatigue Testing

Figure 9:
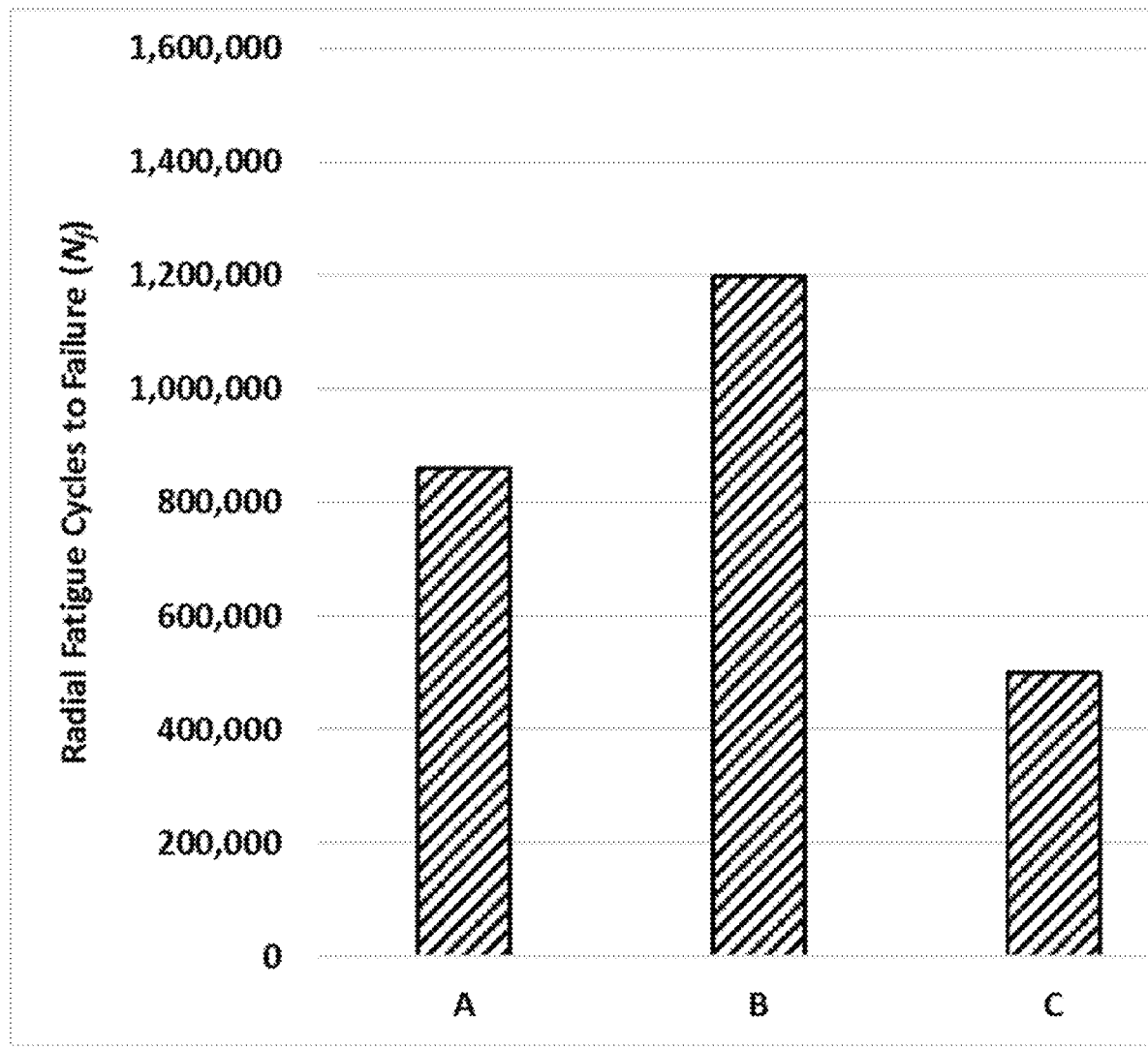
FIG. 9 shows fatigue performance of 18.2 kg wheels shown in FIGS. 6-8.

FIG. 9 shows fatigue performance for test wheel A, test wheel B and test wheel C. The fatigue performance is an average of at least two wheels. Each wheel was an 18.2 kg, industry standard 22.5 inch×8.25 inch (57.15 cm×20.955 cm) hub piloted wheel (part number 42644) manufactured with aluminum alloy AA6099. Fatigue performance was obtained using Accuride CE-006 (which follows SAE J267). Test wheel B has the best fatigue performance of the three test wheels.

Figure 10:
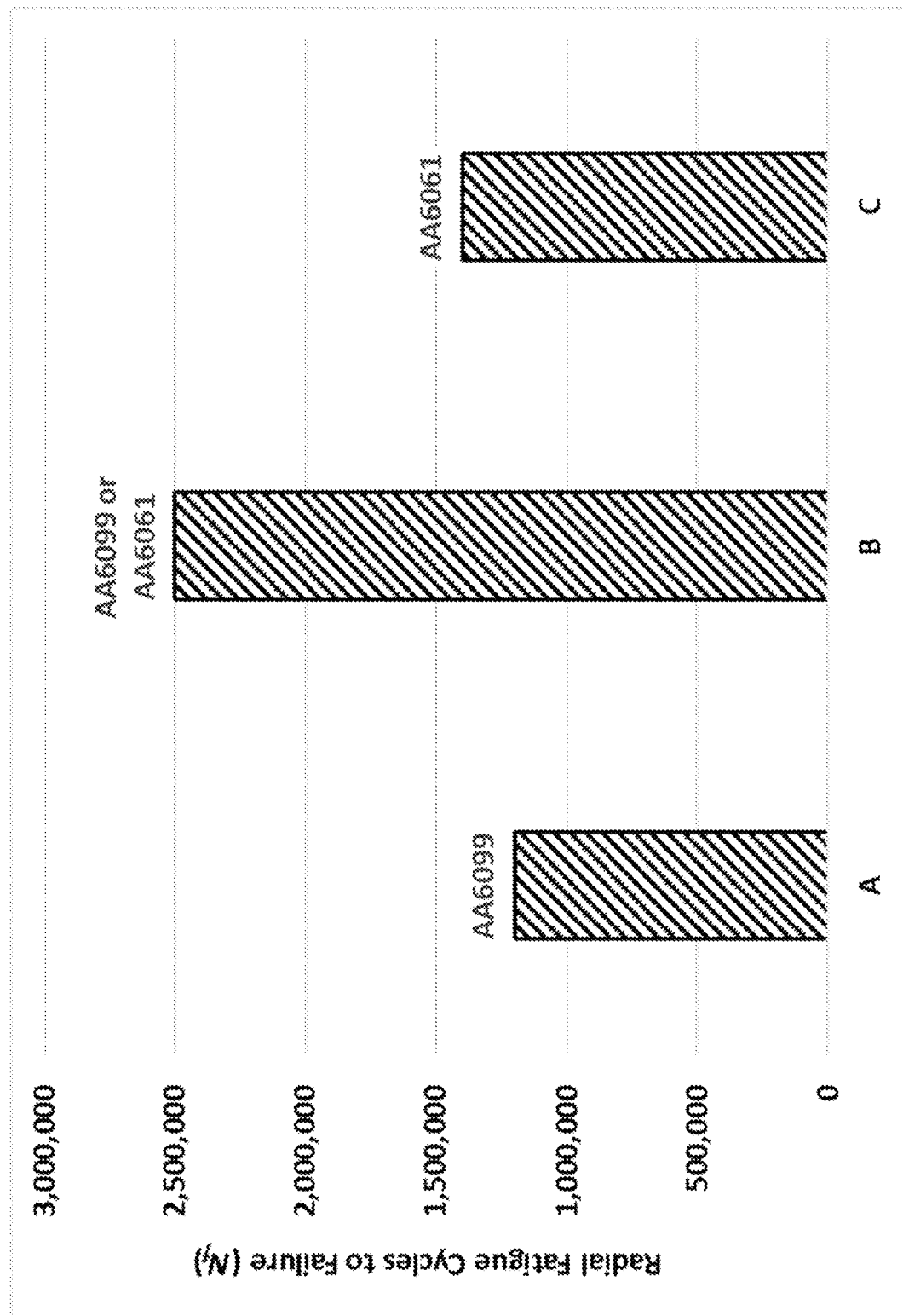
FIG. 10 shows fatigue performance of 20.5 kg wheels.

FIG. 10 shows fatigue performance for test wheel A, test wheel B and test wheel C. The fatigue performance is an average of at least two wheels. Each wheel was a 20.5 kg, industry standard 22.5 inch×8.25 inch (57.15 cm×20.955 cm) hub piloted wheel (part number 41644). Test wheel A was manufactured with aluminum alloy AA6099. Test wheel B was manufactured with AA6099 and AA6061, with similar results for wheels manufactured with each alloy. Test wheel C was manufactured with aluminum alloy AA6061. Fatigue performance was obtained using Accuride CE-006 (which follows SAE J267). Test wheel B has the best fatigue performance of the three test wheels.

For the recitation of numeric ranges herein, each intervening number therebetween with the same degree of precision is contemplated. For example, for the range of 6-9, the numbers 7 and 8 are contemplated in addition to 6 and 9, and for the range 6.0-7.0, the numbers 6.0, 6.1, 6.2, 6.3, 6.4, 6.5, 6.6, 6.7, 6.8, 6.9, and 7.0 are contemplated. For another example, when a pressure range is described as being between ambient pressure and another pressure, that range includes ambient pressure.

It is understood that the foregoing detailed description and accompanying examples are merely illustrative and are not to be taken as limitations upon the scope of the disclosure. Various changes and modifications to the disclosed embodiments will be apparent to those skilled in the art. Such changes and modifications, including without limitation those relating to the chemical structures, substituents, derivatives, intermediates, syntheses, compositions, formulations, or methods of use, may be made without departing from the spirit and scope of the disclosure.

What is claimed is:

1. A wheel, comprising:
a rim; and
a disc having a mounting portion, the mounting portion including:
an inner mounting face and an outer mounting face; and
a coarse grain region and a fine grain region,
the coarse grain region being adjacent to, and at least partially forming, one of the inner mounting face or the outer mounting face;
the coarse grain region including aluminum alloy grains of a first average grain length, wherein the first average grain length is greater than 1 mm;
wherein the coarse grain region has a maximum depth of no less than 6.35 mm;
the fine grain region extending between the coarse grain region and the other of the inner mounting face or the outer mounting face; and
the fine grain region including aluminum alloy grains of a second average grain length, wherein the second average grain length is less than 0.5 mm.

2. The wheel according to claim 1, wherein the disc further comprises a disc slope region between the mounting portion and the rim, and wherein the disc slope region includes aluminum alloy grains of the second average grain length.

3. The wheel according to claim 1, wherein the first average grain length is greater than 1 mm and less than 25 mm.

4. The wheel according to claim 1, wherein the rim and the disc are formed of an aluminum alloy including silicon (Si), iron (Fe), copper (Cu), manganese (Mn), magnesium (Mg), chromium (Cr), zinc (Zn), titanium (Ti), and aluminum (Al).

5. The wheel according to claim 1, wherein the coarse grain region is a first coarse grain region adjacent to, and at least partially forming, the outer mounting face, wherein the mounting portion further includes a second coarse grain region adjacent to, and at least partially forming, the inner mounting face,
wherein the second coarse grain region includes aluminum alloy grains having the first average grain length; and
wherein the fine grain region extends between the first coarse grain region and the second coarse grain region.

6. The wheel according to claim 5, wherein the second coarse grain region has a maximum depth of no less than 6.35 mm.

7. A method for manufacturing a wheel having a rim and a disc, the disc having a mounting portion including an inner mounting face and an outer mounting face, the method comprising:
heating an aluminum alloy billet to a temperature of no less than 480° C. and no greater than 540° C.;
rotary forging the heated aluminum alloy billet; and
after rotary forging, removing a forging cover stock such that the mounting portion of the disc includes a coarse grain region and a fine grain region,
the coarse grain region being adjacent, and at least partially forming, one of the outer mounting face or the inner mounting face;
the coarse grain region including aluminum alloy grains of a first average grain length, wherein the first average grain length is greater than 1 mm;
wherein the coarse grain region has a maximum depth of no less than 6.35 mm;

the fine grain region extending between the coarse grain region and the other of the outer mounting face or the inner mounting face; and the fine grain region including aluminum alloy grains of a second average grain length, wherein the second average grain length is less than 0.5 mm.

8. The method according to claim 7, wherein heating the aluminum alloy billet includes heating the aluminum alloy billet to a temperature of no less than 495° C. and no greater than 540° C.

9. The method according to claim 8, wherein heating the aluminum alloy billet includes heating the aluminum alloy billet to a temperature of no less than 495° C. and no greater than 520° C.

10. The method according to claim 7, wherein rotary forging includes downward forging the heated aluminum alloy billet with a continuous stroke of a die.

11. The method according to claim 10, wherein the single downward continuous stroke is performed at a strain rate of 0.01 seconds$^{-1}$ to 0.3 seconds$^{-1}$.

12. The method according to claim 11, further comprising:
flow forming a contour of the rim; and
performing solution heat treatment and aging after flow forming.

13. A wheel, comprising:
a rim; and
a disc connected to the rim, the disc having:
a mounting portion including an inner mounting face and an outer mounting face, the mounting portion including a coarse grain region and a fine grain region,
the coarse grain region being adjacent to, and at least partially forming, one of the inner mounting face or the outer mounting face;
the coarse grain region having a maximum depth of no less than 6.35 mm;
the coarse grain region including aluminum alloy grains of a first average grain length, wherein the first average grain length is greater than 1 mm and less than 25 mm;
the fine grain region extending between the coarse grain region and the other of the inner mounting face or the outer mounting face; and
the fine grain region including aluminum alloy grains of a second average grain length, wherein the second average grain length is less than 0.5 mm; and
a disc slope region between the mounting portion and the rim, and wherein the disc slope region includes aluminum alloy grains of the second average grain length.

14. The wheel according to claim 13, wherein the coarse grain region is a first coarse grain region adjacent to, and at least partially forming, the outer mounting face, wherein the mounting portion further includes a second coarse grain region adjacent, and at least partially forming, the inner mounting face,
wherein the second coarse grain region includes aluminum alloy grains having the first average grain length;
wherein the fine grain region extends between the first coarse grain region and the second coarse grain region; and
wherein the wheel is formed of an aluminum alloy including silicon (Si), iron (Fe), copper (Cu), manganese (Mn), magnesium (Mg), chromium (Cr), zinc (Zn), titanium (Ti), and aluminum (Al).

15. The wheel according to claim 14,
wherein the second coarse grain region has a second coarse grain region maximum depth of no less than 6.35 mm.

16. The wheel according to claim 15, the aluminum alloy comprising, by weight percentage:
0.8% to 1.2% Si;
0.7% Fe;
0.10% to 0.7% Cu;
0.10% to 0.40% Mn;
0.7% to 1.2% Mg;
0.04% to 0.35% Cr;
0.25% Zn; and
0.10% Ti,
the balance of weight percent comprising aluminum and incidental elements and impurities,
wherein the aluminum alloy comprises dispersoids in a density sufficient to provide a disc slope region grain structure having aluminum alloy grains of the second average grain length.

17. The wheel according to claim 15, the aluminum alloy comprising, by weight percentage:
0.40% to 0.8% Si;
0.7% Fe;
0.15% to 0.40% Cu;
0.15% Mn;
0.8% to 1.2% Mg;
0.04% to 0.35% Cr;
0.25% Zn; and
0.15% Ti,
the balance of weight percent comprising aluminum and incidental elements and impurities,
wherein the aluminum alloy comprises dispersoids in a density of no less than 20 dispersoids per $\mu m^2$.

* * * * *